(12) United States Patent
Dang et al.

(10) Patent No.: US 7,020,376 B1
(45) Date of Patent: Mar. 28, 2006

(54) TOOL DEVICE FOR SELECTIVELY EXTRACTING, INSTALLING AND REMOVING VARIOUS OPTICAL CONNECTORS

(75) Inventors: Long Huu Dang, San Jose, CA (US); Nguyen Tu Nguyen, San Jose, CA (US); Saeed Seyed, Los Altos Hills, CA (US)

(73) Assignee: Cisco Technology, Inc., San Jose, CA (US)

( * ) Notice: Subject to any disclaimer, the term of this patent is extended or adjusted under 35 U.S.C. 154(b) by 396 days.

(21) Appl. No.: 10/355,552

(22) Filed: Jan. 31, 2003

(51) Int. Cl.
*G02B 6/00* (2006.01)

(52) U.S. Cl. ...................................... 385/135; 385/147
(58) Field of Classification Search ........ 385/134–139, 385/147
See application file for complete search history.

(56) References Cited

U.S. PATENT DOCUMENTS

| | | | | |
|---|---|---|---|---|
| 4,155,159 A | * | 5/1979 | Hogan et al. | 29/764 |
| 5,119,547 A | * | 6/1992 | Ii | 29/764 |
| 6,785,460 B1 | * | 8/2004 | de Jong et al. | 385/134 |
| 2003/0161603 A1 | * | 8/2003 | Nadeau et al. | 385/137 |
| 2004/0218885 A1 | * | 11/2004 | Segroves et al. | 385/134 |

* cited by examiner

*Primary Examiner*—Akm Enayet Ullah
*Assistant Examiner*—Jerry T Rahll (57) ABSTRACT

A tool device for selectively extracting, installing, and removing a plurality of optical connectors is disclosed. The tool device has a prying end coupled to a grasping end. The prying and the grasping end are intercoupled by a pair of arms, which is disposed to transmit a grasping force to the grasping end. With respect to the various types of optical connectors and their receptacles that it can be used to extract, install, or remove, the tool device is versatile. The tool can be used on optical connectors of types including 'MTP', 'MPO', 'MT-RJ', 'MU', 'LC', 'SC', and on SFP optical connector receptacles.

28 Claims, 10 Drawing Sheets

TOOL DEVICE FOR SELECTIVELY EXTRACTING, INSTALLING AND REMOVING VARIOUS OPTICAL CONNECTORS

TECHNICAL FIELD

Embodiments of the present invention relate to the field of extracting tool devices. Specifically, embodiments of the present invention relate to a tool device for selectively extracting, installing, and removing various optical connectors.

BACKGROUND OF THE INVENTION

Modern networking, telecommunications, and related endeavors are heavily dependent upon the transmission of data via optical media, such as fiber optics cable. These optical media typically originate and/or terminate from modules, assemblies, drawers, cabinets, and similar equipment mounted in platforms of various types. At these origins and terminals (both hereinafter "terminations"), optical media such as optical fiber are typically connected to the equipment by optical connectors.

Optical connectors are available in a variety of types, styles, and shapes, and other such attributes. Such attributes typically characterize specific interconnective applications. Interconnective applications can physically differ from one another. Physical differences comprise optical and mechanical interconnectivity differences. Optical characteristics allow coupling specific optical media to particular sources (e.g., injection lasers, LEDs, etc.), detectors (e.g., APDs, etc.), and/or other optical media (e.g., fiber to fiber), of varying types.

Optical characteristics of the connectors also relate to corresponding optical characteristics of the optical media to which they are connected. Various optical fibers can differ in wavelength transmissivity, refractive index, and modal properties, core size, and numerical aperture, amongst others. The connectors by which the fibers are optically coupled to their terminations' receptacles can vary accordingly. Connectors can vary between multi-mode step index fiber optics, multi-mode graded index fiber optics, and single mode step index fiber optics.

While mechanical interconnectivity characteristics can support such optical characteristics, they are not limited to optical considerations. Optical connectors having differing mechanical interconnectivity are sometimes selected for particular applications primarily for mechanical considerations, themselves. Mechanical considerations can include structural attributes of the interconnection to be made and of the cable itself (e.g., the type of jacket it has), space and configuration requirements, environmental factors, logistical factors, and the like.

One mechanical consideration is the corresponding mechanical connector configuration of the termination to which the optical connector is to be mated. For any particular termination, the connector of an optical fiber cable can be selected on the basis of the particular optical connection receptacle installed, available, or extant at that particular termination. For instance, a first optical fiber cable can terminate at a multiplexer-demultiplexer (Mux-Demux) module having a particular receptacle. A second fiber cable can terminate at a transponder module.

Where the Mux-Demux module and the transponder share identical optical receptacles and the cables are the same, the optical connectors likewise can be identical. However, where receptacles and/or cables differ between the different devices, it is likely that different connectors will be used to connect the fiber optics to them. Thus, a wide variety of optical connectors are available for terminating fiber optics cables. With reference to Prior Art FIGS. 1A–1D, a number of standard optical connector types are depicted.

Figure 1A:
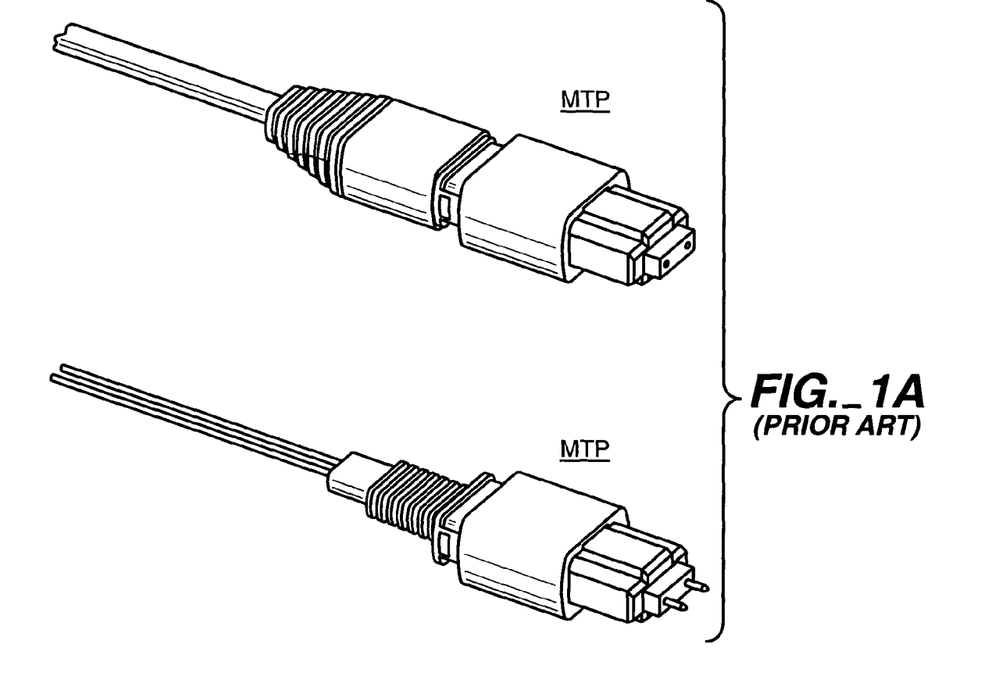
FIG. 1A depicts several type 'MTP' optical connectors.
Figure 1B:
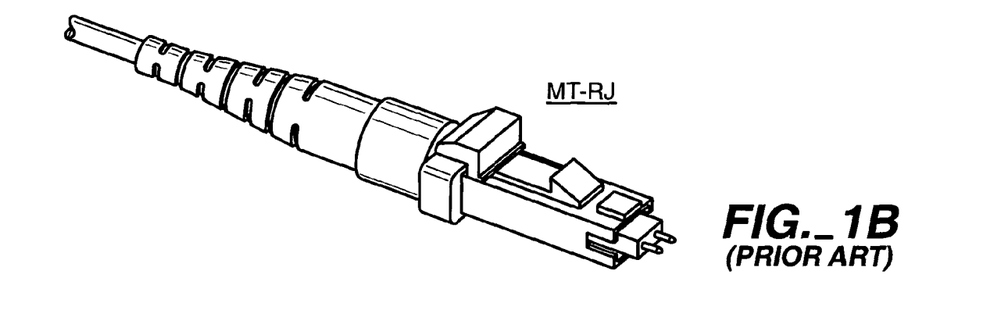
FIG. 1B depicts a first type 'MT-RJ' optical connector.
Figure 1C:
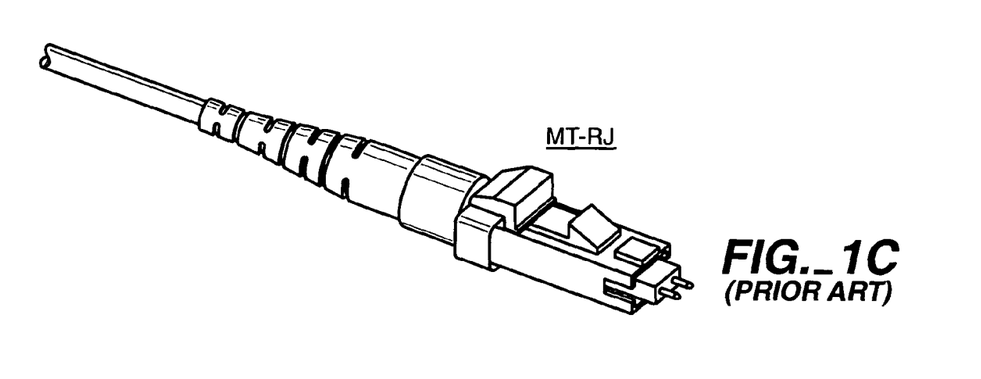
FIG. 1C depicts a second type 'MT-RJ' optical connector.
Figure 1D:
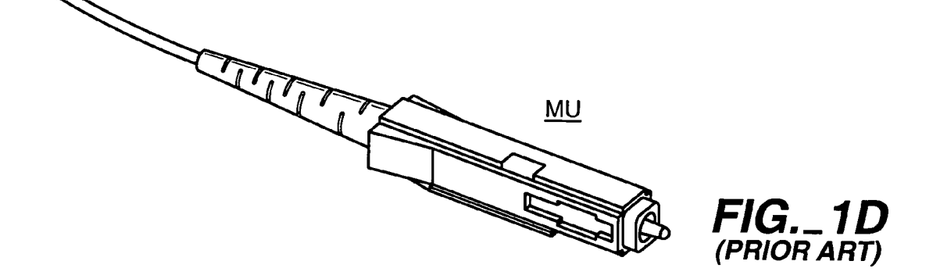
FIG. 1D depicts a type 'MU' optical connector.

Prior Art FIG. 1A depicts a standard optical connector type commonly designated as 'MTP'. 'MPO' type optical connectors are somewhat similar to those of type 'MTP'. Prior Art FIG. 1B depicts a standard optical connector type commonly designated as 'MT-RJ', with pins, configured for connecting a multimode fiber optic cable. Prior Art FIG. 1C depicts a single mode 'MTRJ' optical connector, with pins. Prior Art FIG. 1D depicts a single mode type 'MU' connector, configured to connect a 900 micrometer (µm) buffered fiber.

Figure 1E:
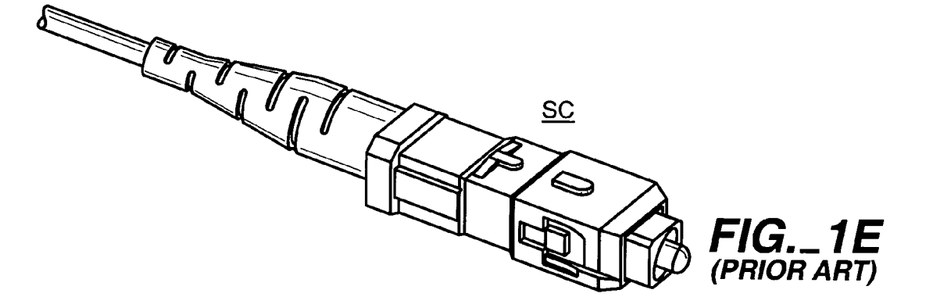
FIG. 1E depicts a first type 'SC' optical connector.
Figure 1F:
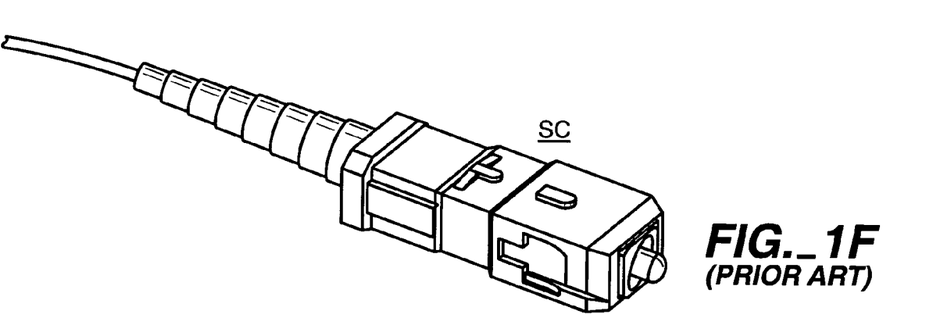
FIG. 1F depicts a second type 'SC' optical connector.
Figure 1G:
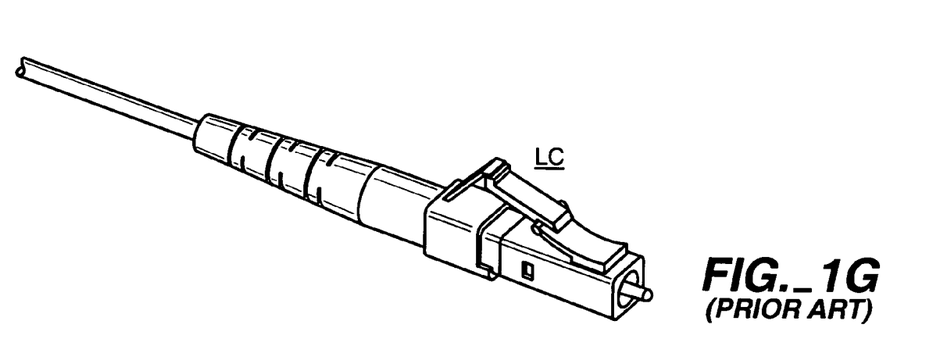
FIG. 1G depicts a first type 'LC' optical connector.
Figure 1H:
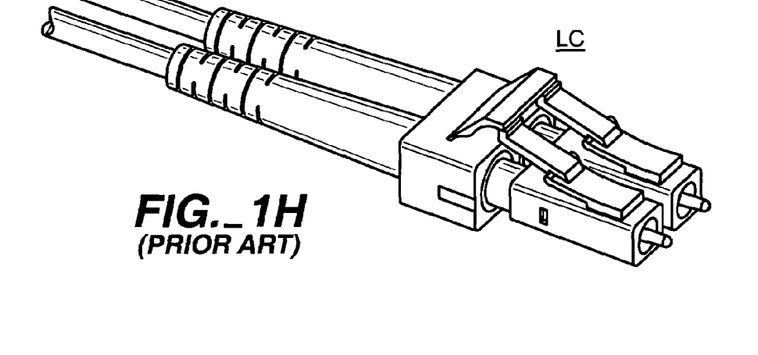
FIG. 1H depicts a second type 'LC' optical connector.

Prior Art FIG. 1E depicts a standard optical connector type commonly designated as 'SC', configured to connect a multimode fiber optic deployed in a 3 millimeter (mm) simplex cable. Prior Art FIG. 1F depicts the type 'SC' connector, as configured to connect a single mode 900 µm buffered fiber. Prior Art FIG. 1G depicts a standard optical connector type commonly designated 'LC', configured as a single mode simplex connector on a 2 mm jacketed cable. FIG. 1H depicts type 'LC' configured for a multimode duplex 3 mm cable.

As a comparison of the optical connectors depicted in Prior Art FIGS. 1A–1H reveals, the mechanical configuration, including shape, contour, size, protrusions, recesses, appurtenances, accoutrements, and the like, of these various optical connectors differ significantly from one another. Type 'MU' conforms to a somewhat regular rectangular prism, with an approximately square connecting end and a few recesses in its outer case. Types 'SC' and 'MTRJ' instead have more irregular rectangular contours.

'SC' however has recesses different from those in 'MU' and small protrusions and an approximately rounded square connecting end protruding from its rectangular body. 'MTRJ', on the other hand, has a large protrusion at the end of its body opposite from the connection end, which is rectangular, and can have multiple pins protruding therefrom. Types 'LC' and 'MTP' or 'MPO' differ from each other significantly, as well as from the types 'SC', 'MU', and 'MTRJ', described above.

Optical connector types 'MT-RJ', 'LC', and 'SC' conform to optical connection termination receptacles to which they are pluggably coupled that have relatively small size. These connectors leave a relatively small footprint (e.g., small physical size and correspondingly low space occupancy). Such connectors and termination receptacles are typically known as small form factor pluggable (SFP) optics, such as types 'MT-RJ', 'LC', and 'SC' connectors. SFP optics are typically used to optically couple fibers to devices such as transponder modules.

Figure 1I:
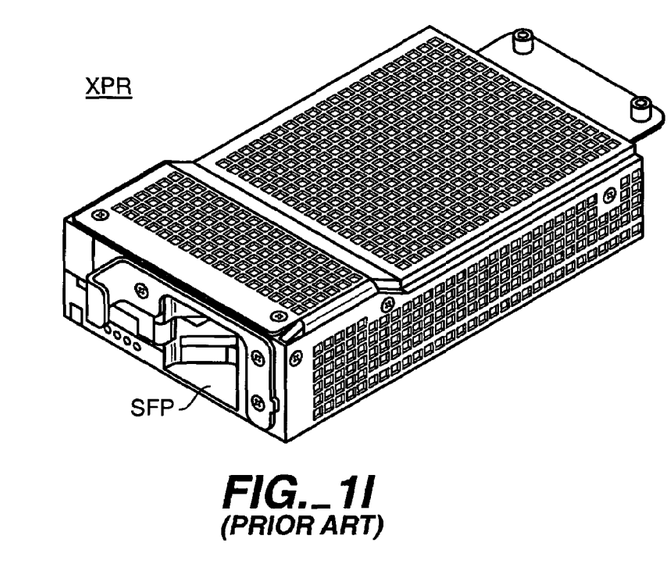
FIG. 1I depicts a typical transponder module with a SFP termination receptacle.
Figure 1J:
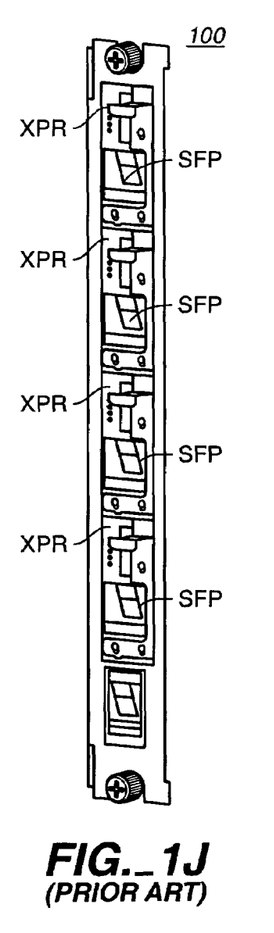
FIG. 1J depicts a stack of transponder modules.
Figure 1K:
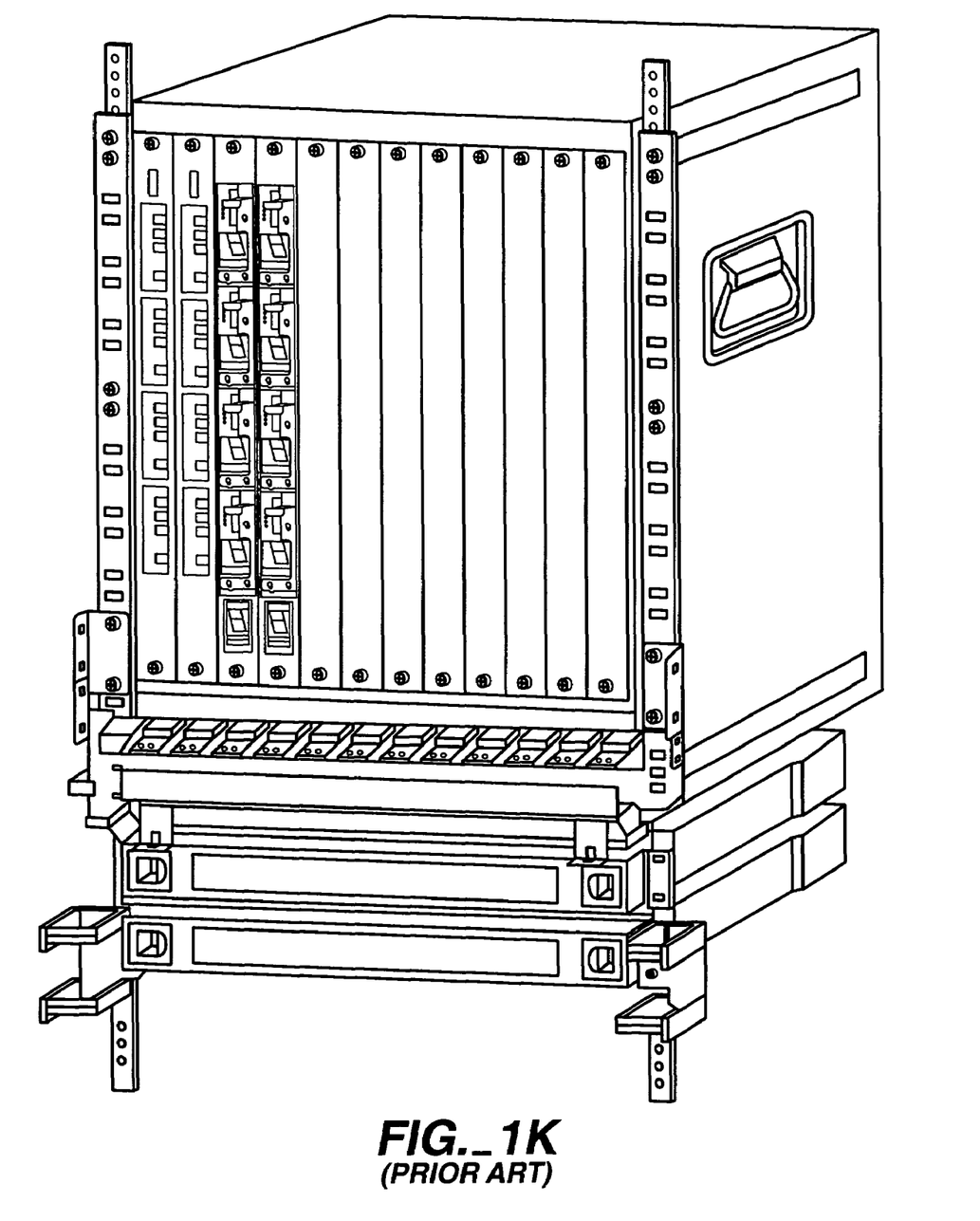
FIG. 1K depicts a rack with Mux/Demux modules with termination receptacles for various optical connectors.

Prior Art FIG. 1I depicts a typical transponder module, in this example, an extended range transponder module XPR. Module XPR has an SFP optical connector termination receptacle SFP. Modules such as transponder module XPR are sometimes stackable. Prior Art FIG. 1J depicts a stack 100 of transponder modules XPR, each with an SFP optical connector termination receptacle SFP. A rack 105 with other modules, such as Mux/Demux modules, terminating SFP and other type connectors is shown in Prior Art FIG. 1K.

In as much as optical connectors' mechanical interconnectivity characteristics can support their optical characteristics, the mechanical aspects are designed for optimal optical coupling. Good optical coupling requires stable, effectively rigid, substantially flat mechanical coupling. Such coupling is also important for mechanical reasons such as maintaining connection integrity under strain and/or vibration, excluding contaminants, which can fouling the optical surfaces, and the like. Such mechanical coupling is typically a strong, tight, and rigid bond.

Certain equipment engineering standards add requirements for such mechanical interconnectivity. For instance, network equipment is typically built to conform to Network Equipment Building Systems (NEBS) compliant standards. To meet the global demand for such equipment, it is sometimes built to conform to European Telecommunications Standard Institute (ETSI) specifications, as well. Optical receptacles and connectors in NEBS-compliant and ETSI-compliant equipment meet a stringent depth specification.

In order to meet the stringent depth requirements for NEBS-compliant and ETSI compliant equipment, optical connections are typically configured such that the optical connectors thereof are reset (e.g., recessed) when connected thereto, within the module hosting the connection. The recessing of such connectors to ensure compliance with NEBS, ETSI, and other such standards can add to the effort, perhaps significantly, required to work with the connectors. Such an effort can also be increased by mechanical interconnectivity attributes.

Mechanical couplings for optical connections however typically must also be de-coupleable, for maintenance, optical routing and installation changes, and other reasons. Coupling and de-coupling operations on tightly or rigidly fitting optical connectors are sometimes performed in active equipment, with space and configuration restrictions, and fragility considerations. For this and other reasons, technicians and others performing such operations sometimes seek the mechanical advantage provided by tools such as extracting tools.

Conventional optical connector extracting tools are typically unique to each particular type of optical connector, termination receptacle, or to a small group of similar such components. Thus, a separate tool is needed for extracting each particular type of optical connector. However, modern networking, telecommunication, and other such equipment sometimes comprise modules terminating several different types of optical connectors and deploy within them various types of optical media, perhaps each with differing optical connectors.

For example, one modern tower style networking platform deploys a Mux-Demux module, a transponder module, and a high capacity (e.g., 10 Gigabytes) data storage module assembly. The Mux-Demux module terminates fiber optics bearing both 'MTP' and 'MU' type connectors. The transponder module terminates fiber optics bearing 'SC' type connectors on SFP receptacles. The 10 Gbyte module uses 'LC' or 'MT-RJ' connectors for intra-assembly, and 'SC', 'LC' or 'MTP' types for connections to other systems.

To service or install changes in the exemplary platform, five different conventional extractor tools can be required, one for each type of connector or receptacle that may be encountered therein. Requiring such a multiplicity of tools can be problematic. The costs of such tools are not trivial. Thus, requiring separate tools can be expensive. A tool can become separated from the others and lost. Selecting the proper tool from among several for a particular connector can cause confusion, and using the wrong tool can cause damage.

SUMMARY OF THE INVENTION

A tool device for selectively extracting, installing, and removing a plurality of optical connectors is disclosed. The tool device comprises a prying end coupled to a grasping end. In one embodiment, the prying and the grasping end are intercoupled by a pair of arms, which is disposed to transmit a grasping force to the grasping end.

The prying end comprises a prying protrusion and a vertex coupled thereto, which intercouple each of the pair of arms. The grasping end comprises an opposing pair of pinchers that are intercoupled by the arms and turned in therefrom, thus disposed to grasp one of the plurality of optical connectors. The pinchers can have a protrusion disposed to fit into a recess or groove on some of the plurality of optical connectors.

The pair of arms is also disposed to transmit a prying force to the prying end. This prying force can be used to extract a SFP optical connector receptacle from a module. Further, the arms are disposed to transmit, selectively, a pushing force and a pulling force to the grasping end. The pushing force is used to install an optical connector in a receptacle. The pulling force, on the other hand is used to remove the optical connector from a receptacle.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

Prior Art

Prior Art

Prior Art

Prior Art

Prior Art

Prior Art

Prior Art

Prior Art

Prior Art

Prior Art

FIGS. 1A–11B are drawn for illustrative purposes and are not necessarily drawn to scale. Where scales and/or measurements are used herein, they are for exemplary and illustrative purposes only. Embodiments of the present invention are well suited for practice using measurements different from those shown.

DETAILED DESCRIPTION OF THE INVENTION

Reference will now be made in detail to embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications, and equivalents, which may be included within the spirit and scope of the invention as defined by the appended claims.

Furthermore, in the following detailed description of the present invention, numerous specific details are set forth in order to provide a thorough understanding of the present invention. In other instances, well known components, methods, materials, and procedures have not been described in detail so as not to unnecessarily obscure aspects of the present invention. Embodiments of the present invention are discussed primarily in the context of a versatile tool device for extracting various optical connectors.

A tool device for selectively extracting, installing, and removing a plurality of optical connectors is disclosed. The tool device comprises a prying end coupled to a grasping end. In one embodiment, the prying and the grasping end is intercoupled by a pair of arms, which is disposed to transmit a grasping force to the grasping end. With respect to the various types of optical connectors and their receptacles that it can be used to extract, install, or remove, the tool device is versatile. The tool can be used on optical connectors of types including but not limited to 'MTP', 'MPO', 'MT-RJ', 'MU', 'LC', 'SC', and on SFP optical connector receptacles.

Therefore, the conventional need can be dispensed with for a multiplicity of tools to service or install optical media changes, one for each type of connector or receptacle that may be encountered. Embodiments of the present invention allow an economic benefit, because the costly multiplicity of separate tools for the various types of optical connectors is replaced by a single, relatively inexpensive tool.

In one embodiment, the versatile tool described herein can be affixed to the equipment at which it is to be used, advantageously ameliorating the problem of tool loss associated with the conventionally required multiplicity of tools. Further, the problem of selecting the wrong tool and the corresponding problems of connector damage due to attempted use of such a wrong tool, also associated with the conventionally required multiplicity of tools, is ameliorated.

Figure 9A:
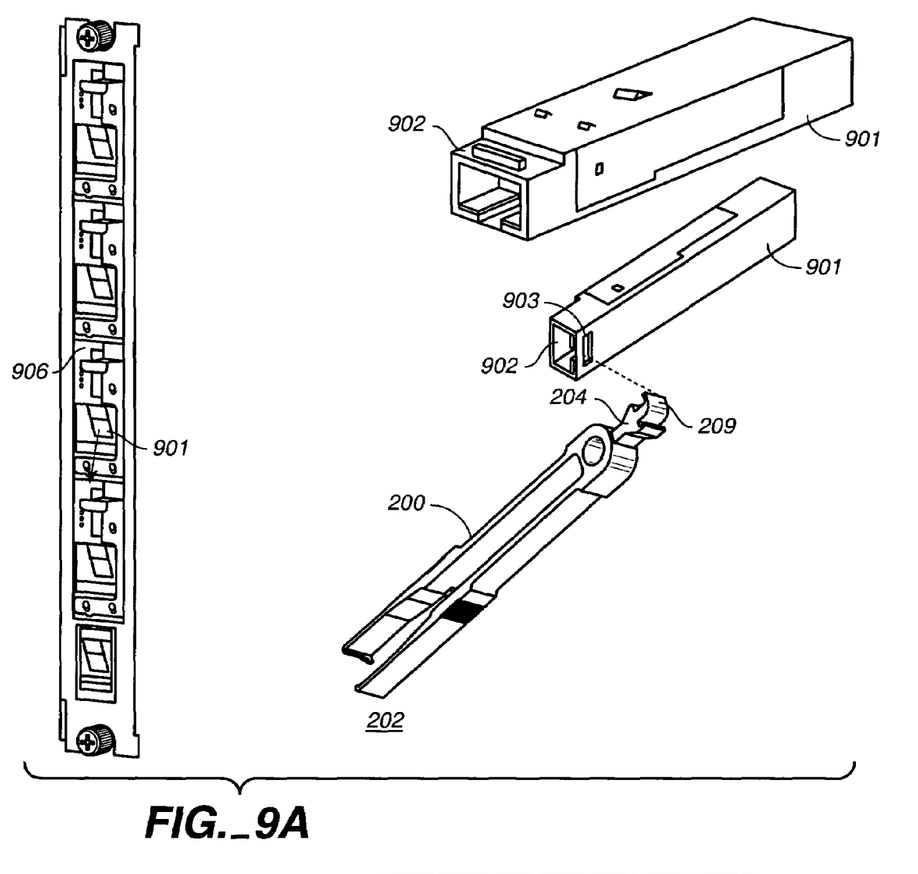
FIG. 9A depicts a versatile optical connector extractor tool in use extracting an 'SFP' type optical connector receptacle, according to one embodiment of the present invention.
Figure 9B:
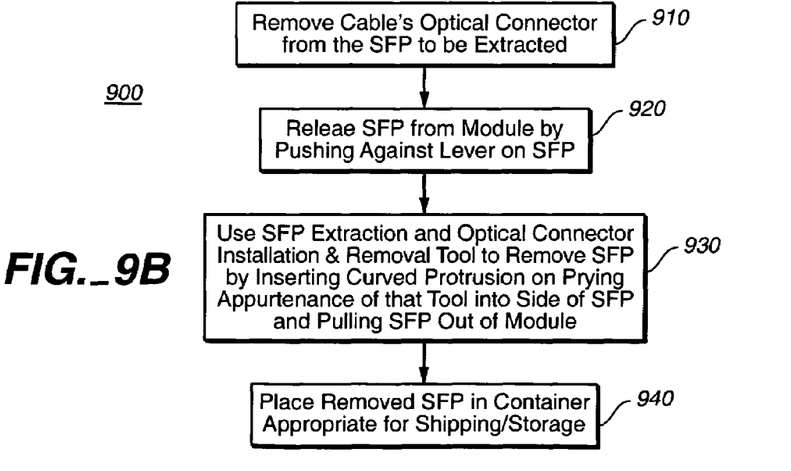
FIG. 9B is a flowchart of the steps in a process for extracting an 'SFP' type optical connector receptacle using a versatile optical connector extractor tool, according to one embodiment of the present invention.
Figure 10A:
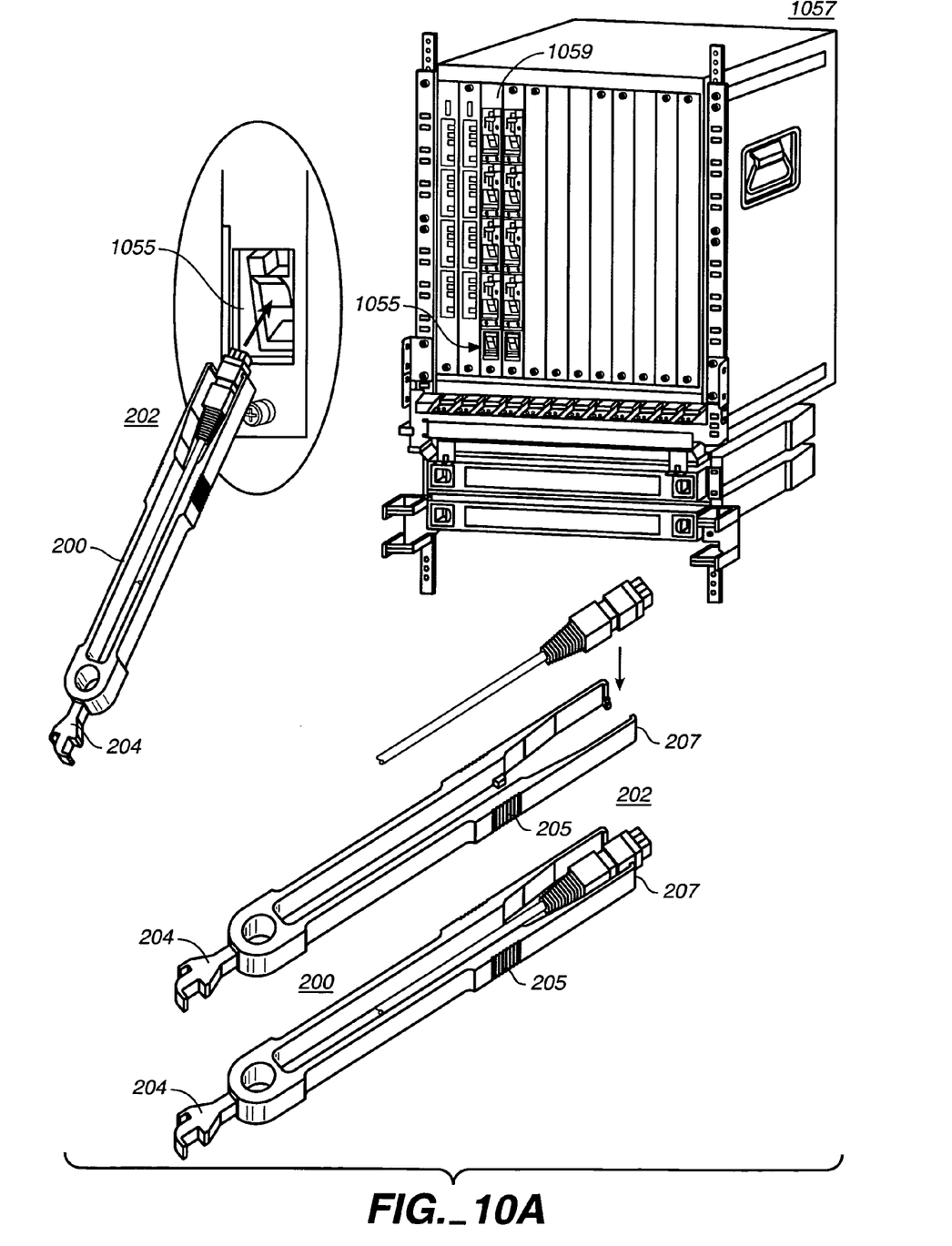
FIG. 10A depicts a versatile optical connector extractor tool in use with a type 'MTP' optical connector, according to one embodiment of the present invention.
Figure 10B:
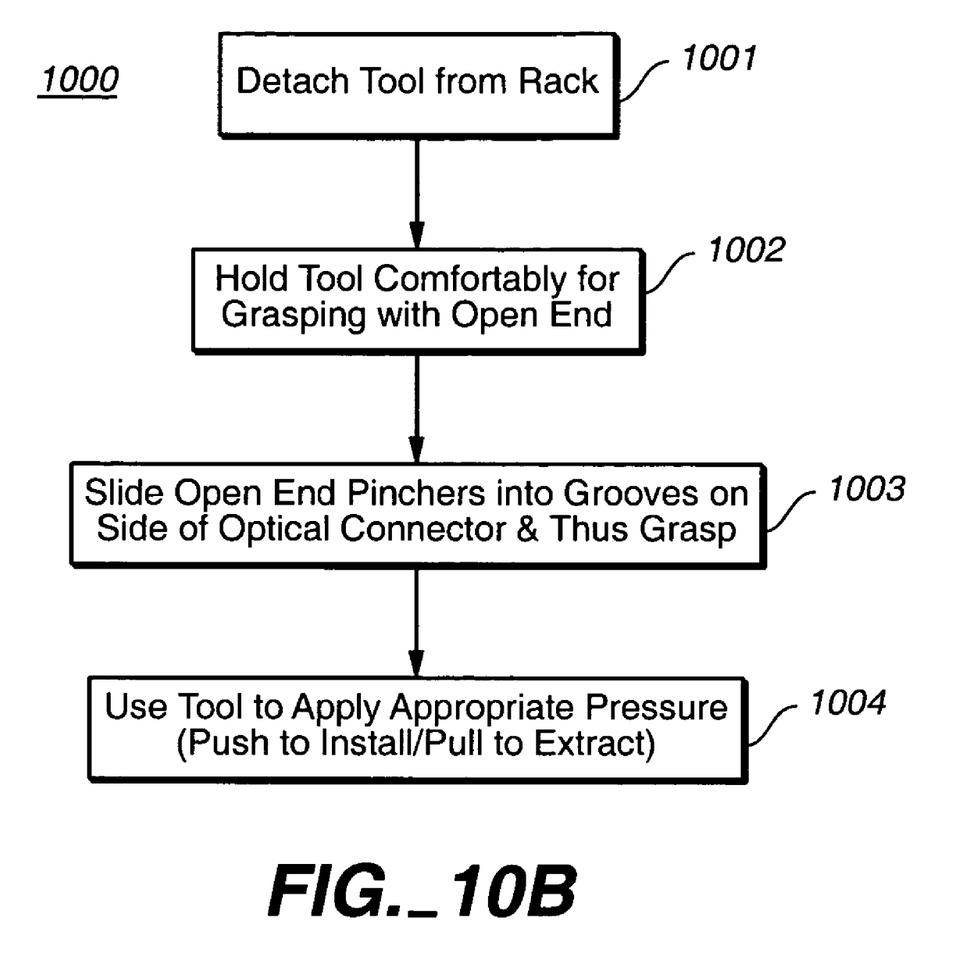
FIG. 10B is a flowchart of the steps in a process for installing/removing a type 'MTP' optical connector using a versatile optical connector extractor tool, according to one embodiment of the present invention.
Figure 11A:
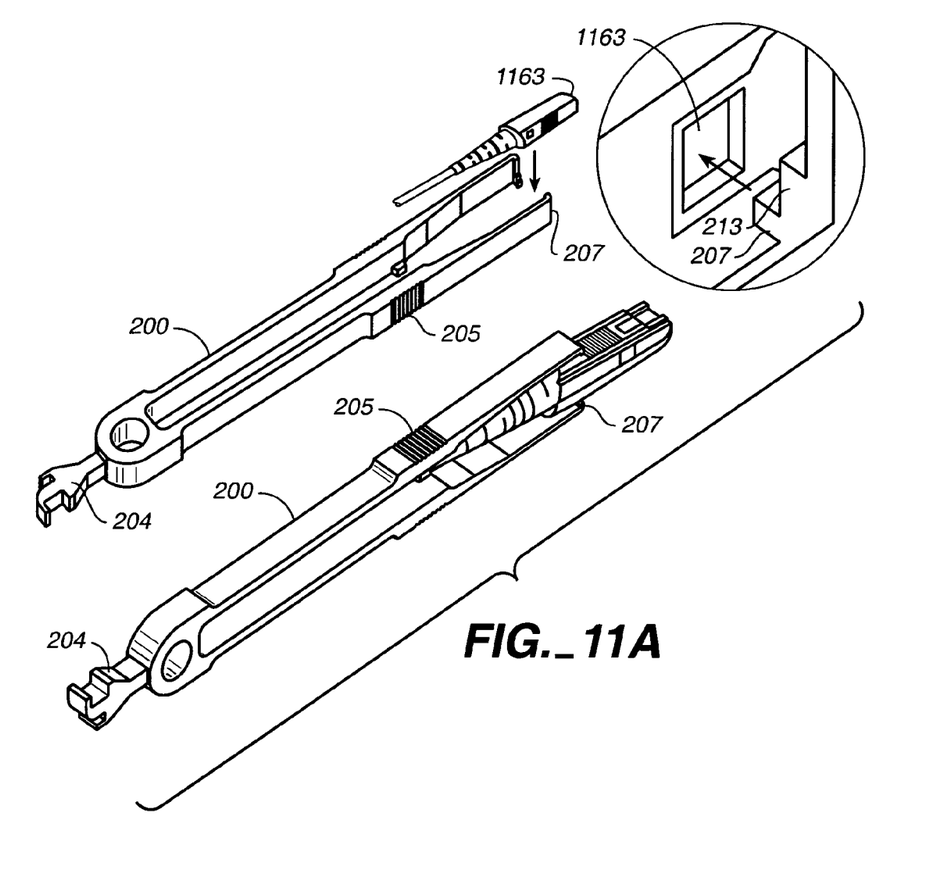
FIG. 11A depicts a versatile optical connector extractor tool in use with a type 'MU' optical connector, according to one embodiment of the present invention.
Figure 11B:
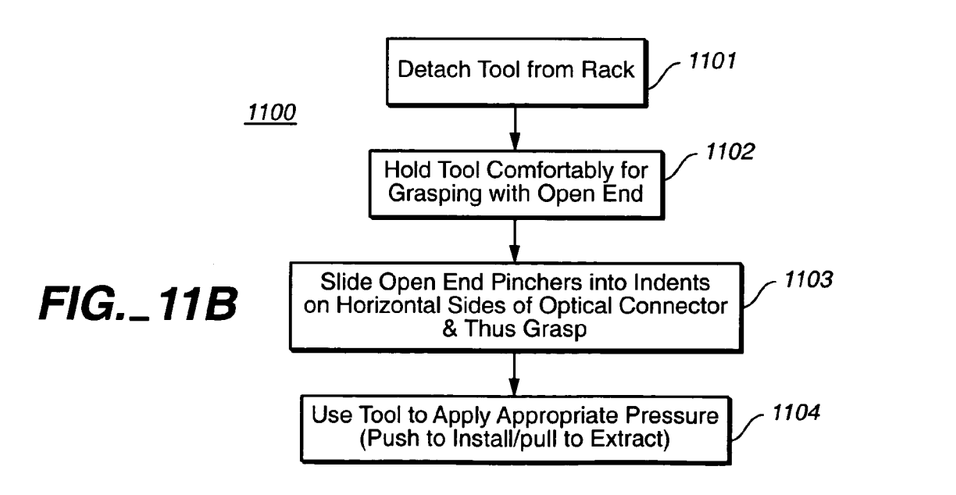
FIG. 11B is a flowchart of the steps in a process for installing/removing a type 'MU' optical connector using a versatile optical connector extractor tool, according to one embodiment of the present invention.

Certain portions of the detailed descriptions of embodiments of the invention, which follow, are presented in terms of processes and methods (e.g., processes 900, 1000, and 1100 of FIGS. 9B, 10B, 11B, respectively). Although specific steps are disclosed herein describing the operations of these processes and methods, such steps are exemplary. That is, embodiments of the present invention are well suited to performing various other steps or variations of the steps recited in the flowcharts of the figures herein.

Exemplary Versatile Optical Connector Tool

Figure 2A:
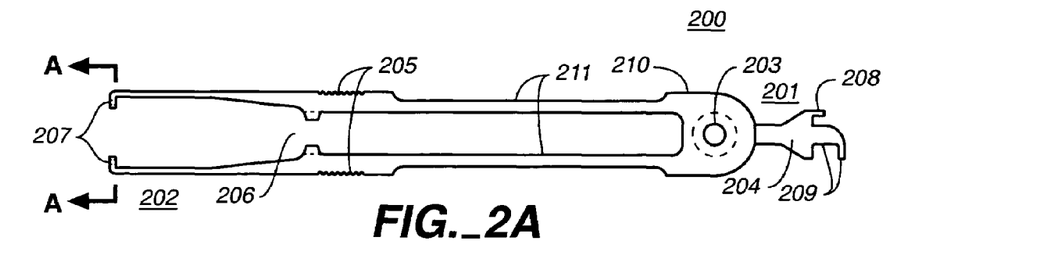
FIG. 2A depicts a view of the top of a versatile optical connector extractor tool, according to one embodiment of the present invention.

With reference to FIG. 2A, a view of the top of a versatile optical connector extractor tool 200 is depicted, according to one embodiment of the present invention. In one embodiment, extractor tool 200 is made from a single piece of aluminum. The aluminum comprising extractor tool 200 in one embodiment is finished with a nickel plating, which can be applied using an electroless or other deposition method.

With respect to its longest dimension, extractor tool 200 has two ends. End 201 is a prying end utilized for the extraction of small form factor pluggable (SFP) optics, to which such as optical connector types as 'MT-RJ', 'LC', and 'SC' couple. The end 202 (opposite from end 201) is a grasping end, used for the extraction and installation of types 'MU', 'MTP' and 'MPO' (hereinafter, 'MTP/MPO') connectors. End 201 forms a vertex 210 connecting two arms 211.

Vertex 210, in one embodiment, is penetrated by a hole 203, which can be threaded, to facilitate attaching extractor tool 200 to a cabinet, tower, or other structure. A prying appurtenance 204 is appended at the end of the circumference of vertex 210 extremely opposite from grasping end 202. Prying appurtenance 204 has a short, straight protrusion 208, as well as a curved protrusion and base ledge 209, both for facilitating extracting SFP connectors.

The dimensions shown for prying appurtenance 204 are exemplary of the dimensions of one embodiment. However, alternative embodiments having dimensions varying somewhat from those shown are well suited to facilitate the extraction of SFP connectors, as well. In the present embodiment, prying appurtenance 204 is of the same stock as the rest of extracting tool 200. In another embodiment, prying appurtenance 204 is removably coupleable.

Connecting arms 211 can be thickened and/or have gripping ridges 205 machined into its outer surfaces at a position of heightened mechanical advantage, in the present embodiment approximately ⅔ of the length down towards end 202 from end 201. Thickening strengthens arms 211 for gripping 'MU' and 'MTP/MPO' connectors in a forceful tweezers-like grip with pinchers 207. Gripping ridges 205 help provide a comfortable yet forceful grip, including during pulling for removal and pushing for installing optical connectors on terminal receptacles.

Arms 211 are disposed to thus transmit a grasping force to the pinchers 207 on grasping end 202. Optical connectors can thus be grasped by the pinchers 207. Blockers 206 restrict the degree to which end 202 can be forced to constrict, thus serving as a blocking mechanism restricting the grasping force. Advantageously, restricting the grasping force can prevent the damage to optical conductors that excessive grasping force can cause.

Figure 2B:
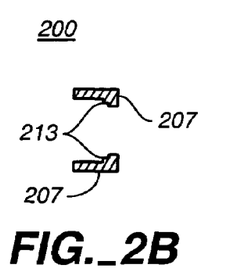
FIG. 2B depicts a cross sectional view, taken across a section defined in FIG. 2A, of the front end of a versatile optical connector extractor tool according to one embodiment of the present invention.

FIG. 2B depicts a cross sectional view of pinchers 207, taken across Section 'A' of end 202, as defined in FIG. 2A. This frontal perspective shows that pinchers 207 have protrusions 213, which help facilitate gripping notches, ridges, or other structures on various optical connectors. Dimensions shown for pinchers 207 are exemplary of the dimensions of one embodiment. However, alternative embodiments having dimensions varying somewhat from those shown are well suited to facilitate gripping optical connectors, as well.

Figure 3:
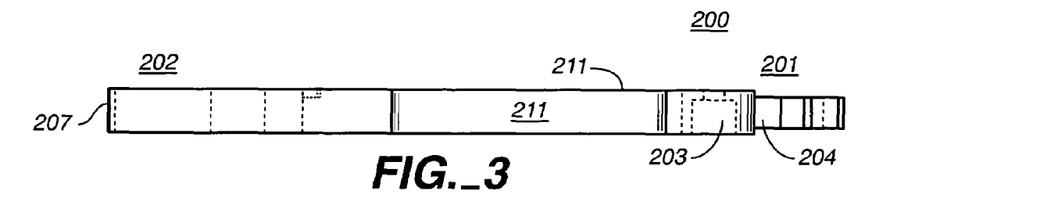
FIG. 3 depicts a view of the right side (with respect to the front) of a versatile optical connector extractor tool, according to one embodiment of the present invention.

FIG. 3 depicts a view of the right side (with respect to the front) of versatile optical connector extractor tool 200, according to one embodiment of the present invention. The sides of arms 211 are substantially flat from end 201 to end 202.

Appurtenance 204 has substantially flat horizontal edges parallel with the edges of arms 211, and recessed there from by some small amount, with respect to its width.

The dimensions shown exemplify one embodiment. However, alternative embodiments having dimensions varying somewhat from those shown are well suited to facilitate extracting SFP connectors, as well.

Figure 4A:
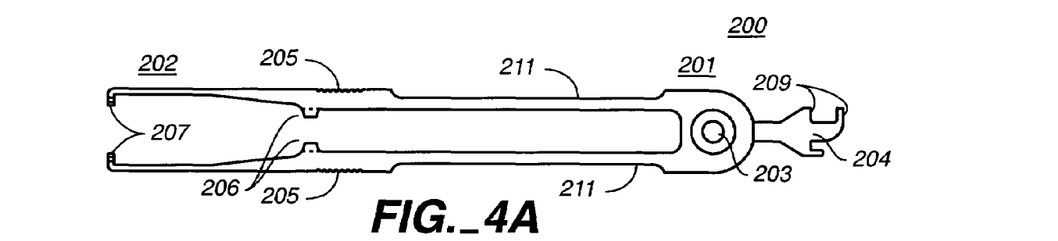
FIG. 4A depicts a view of the bottom of a versatile optical connector extractor tool, according to one embodiment of the present invention.

FIG. 4A depicts versatile optical connector extractor tool 200 from the perspective of its bottom (e.g., its side opposite from the top side depicted in FIG. 2A). The dimension shown from one of arms 211 to the other at pinchers 207 exemplify one embodiment. However, alternative embodiments having a dimension varying somewhat from that shown are well suited to facilitate installing and extracting types 'MU' and 'MTP/MPO' connectors, as well.

Figure 4B:
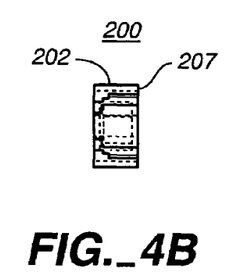
FIG. 4B depicts a cut away view of the front end of a versatile optical connector extractor tool, according to one embodiment of the present invention.
Figure 4C:
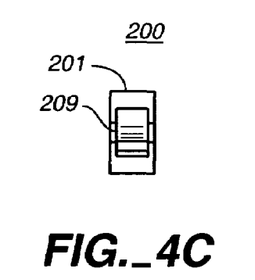
FIG. 4C depicts a view of the rear end of a versatile optical connector extractor tool, according to one embodiment of the present invention.

FIG. 4B depicts a cut away view of the optical connector extractor tool 200, viewed from its front end 202 (e.g., looking directly onto pinchers 207), according to one embodiment of the present invention. FIG. 4C depicts a view of the rear end 201 (e.g., looking directly onto appurtenance 204) of versatile optical connector extractor tool 200.

Figure 5:
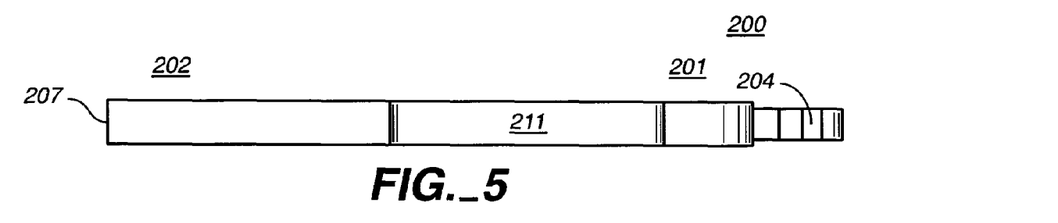
FIG. 5 depicts a view of the left side (with respect to the front) of a versatile optical connector extractor tool, according to one embodiment of the present invention.

FIG. 5 depicts a view of the left side (with respect to the front) of versatile optical connector extractor tool 200, according to one embodiment of the present invention. The sides of arms 211 are substantially flat from end 201 to end 202. The dimensions shown exemplify the length of the longest dimension of tool 200 and its height as taken resting on its bottom (e.g., as displayed in FIG. 4A, or top, as displayed in FIG. 2A) of one embodiment. However, alternative embodiments having dimensions varying somewhat from those shown are well suited to facilitate manipulating optical connectors, as well.

Figure 6:
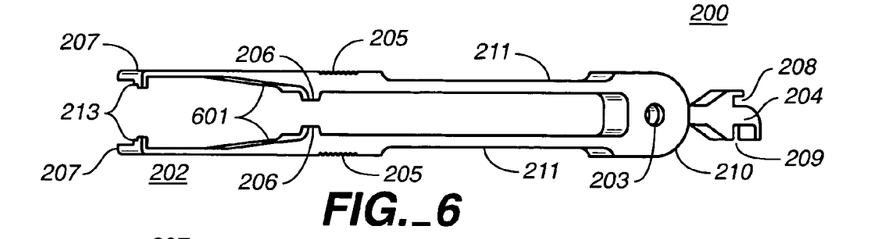
FIG. 6 depicts a view of a versatile optical connector extractor tool from a perspective above and forward of the tool, according to one embodiment of the present invention.

FIG. 6 depicts a view of versatile optical connector extractor tool 200 from a perspective of above and forward of the tool (e.g., with respect to the view depicted in FIG. 2A), according to one embodiment of the present invention. From strengthened area 689 where arms 211 are thickened as described above (e.g., near gripping ridges 205) forward pinchers 207, arms 211 gradually become thinner. This transition in one embodiment forms a gradual taper 601.

Figure 7:
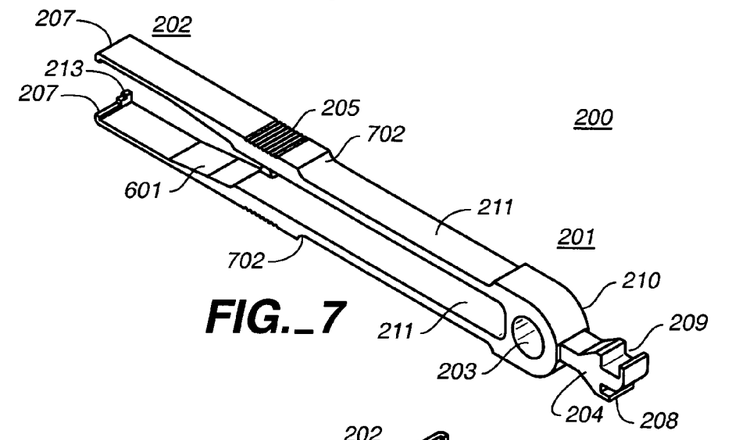
FIG. 7 depicts a view of a versatile optical connector extractor tool from a perspective below, and behind the left side of the tool, according to one embodiment of the present invention.

FIG. 7 depicts a view of optical connector extractor tool 200 from a perspective below and behind the left side of the tool (e.g., with respect to the view depicted in FIG. 2A), according to one embodiment of the present invention. From the portion running forward from vertex 210 to the portion near gripping ridges 205, arms 211 thicken. This transition in one embodiment forms a taper 701 that is somewhat steep (e.g., relative to taper 601).

Figure 8:
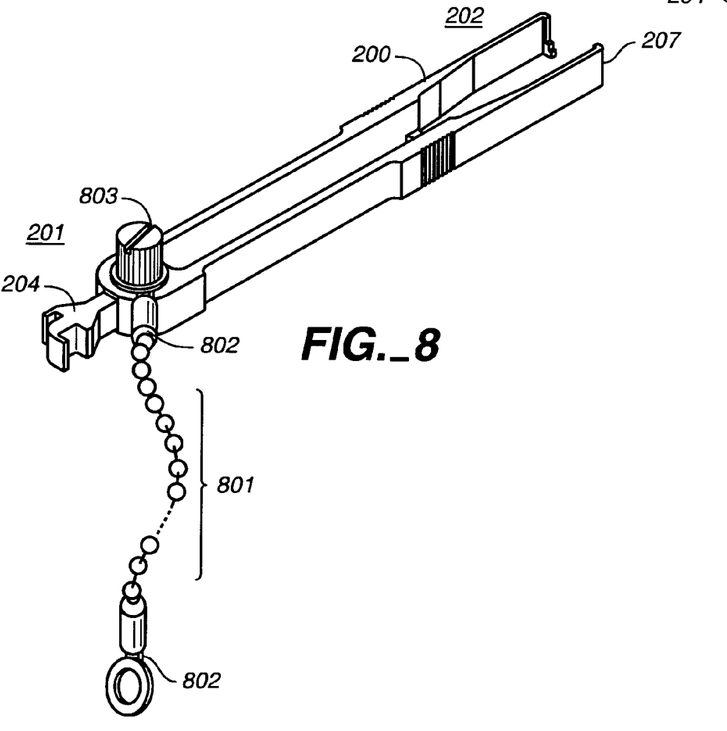
FIG. 8 depicts a versatile optical connector extractor tool with a lanyard installed, according to one embodiment of the present invention.

FIG. 8 depicts optical connector extractor tool 200 with an optional attaching lanyard 801 attached. In one embodiment, lanyard 801 is a metallic chain. Lanyard 801 can be terminated by ring-tongued terminals 802, affixed to the chain by crimping. Lanyard 801 is attached to extractor tool 200 by a screw 803 threaded into hole 202 (FIGS. 2A, 3, 4A, 6, 7) through the ring tongue of one of terminals 802.

The opposite terminal 802 can be attached to the cabinet, tower, or other structure housing extractor tool 200, such that the tool is readily available for use. Lanyard 801 as depicted and described characterizes one embodiment. Lanyard 801 however can take another form in another embodiment, yet remain well suited to attach tool 201 for ready availability.

Exemplary Extractor Tool Use

In the following description of the use of a versatile SFP extraction and optical connector installation and removal tool according to embodiments of the present invention, illustrative drawings depicting the tool in use with the components upon which it is used will be used. In each case, the process of using the tool on those particular components will be also described using a corresponding flowchart. For purposes of clarity and brevity, the illustrative drawings and the flowcharts will be discussed simultaneously.

Exemplary SFP Extraction

Referring to FIGS. 9A and 9B, the use of a versatile SFP extractor and optical connector installation and removal tool 200 to remove an SFP 901 from a module 906 using a process 900 is described. In step 910, an fiber optic cable (not shown) having an optical connector such as a type 'MT-RJ' (or e.g., 'LC' or 'SC') is removed from the SFP 901 to be extracted.

End 202 of tool 200 can be used to assist in removing the fiber optic cable, by gripping the optical connector thereon and pulling outward. In step 920, SFP 901 is released from module 906 by pushing against lever 902 on SFP 901.

In step 930, curved protrusion 209 on prying appurtenance 904 of tool 200 is inserted into slot 903 in the side of SFP 901. Mechanical force is applied via tool 200 and SFP 901 is pulled out of module 906. Upon removal, in step 940, SFP 901 is placed in a container appropriate for storage and/or shipping, upon which, process 900 is complete.

Exemplary 'MTP' Installation and Removal

Referring to FIGS. 10A and 10B, a process 1000 is described for removing or installing a fiber optic cable having a 'MTP' (or e.g., a type 'MPO' or 'MT-RJ') optical connector from a connection 1055 in an exemplary Mux/Demux module 1059 mounted in rack 1057.

Process 1000 begins with step 1001, wherein tool 200 is detached from rack 1057, or is removed from packaging or a tool kit. In step 1002, tool 200 is held comfortably for grasping fiber optic cable components using its open end 202 (e.g., opposite from prying protrusion 204).

In step 1003, the open end 202 of tool 200 is slid into grooves that exist on the side of the 'MTP' or other optical connector and the optical connector is thus grasped. The side of the optical connector must be grasped by its grooves; incorrectly grasping by the connector's top and bottom can cause damage to the connector.

In step 1004, pressure is applied using the tool to selectively decouple the optical connector by pulling, or to install the optical connector by pushing. This completes process 1000.

Exemplary Installation and Removal of Type 'MU' Cables

Referring to FIGS. 11A and 11B, a process 1100 is described for removing or installing a fiber optic cable having a 'MU' (or e.g., a type 'LC' or 'SC') optical connector from a connection.

Process 1100 begins with step 1101, wherein tool 200 is detached from rack 1057, or is removed from packaging or a tool kit. In step 1102, tool 200 is held comfortably for grasping fiber optic cable components using its open end 202 (e.g., opposite from prying protrusion 204).

In step 1103, pinchers 207 of tool 200 are placed so that its protrusion 213 are inserted into indents 1163 on the horizontal sides (e.g., top, bottom) of the optical connector, which is thus grasped with a gentle clamping action. Clamping down on the optical connector with excessive force can damage the connector.

In step 1104, pressure is applied using the tool to selectively decouple the optical connector by pulling, or to install the optical connector by pushing. This completes process 1100.

In summary, a tool device for selectively extracting, installing, and removing a plurality of optical connectors is disclosed. The tool device comprises a prying end coupled to a grasping end. In one embodiment, the prying and the grasping end is intercoupled by a pair of arms, which is disposed to transmit a grasping force to the grasping end. With respect to the various types of optical connectors and their receptacles that it can be used to extract, install, or remove, the tool device is versatile. The tool can be used on optical connectors of types 'MTP', 'MPO', 'MT-RJ', 'MU', 'LC', 'SC', and on SFP optical connector receptacles.

An embodiment of the present invention, a tool device for selectively extracting, installing, and removing a plurality of optical connectors, is thus described. While the present invention has been described in particular embodiments, it should be appreciated that the present invention should not be construed as limited by such embodiments, but rather construed according to the following claims and their equivalents.

What is claimed is:

1. A tool device for selectively extracting, installing, and removing a plurality of optical connectors, comprising:
   a prying end; and
   a grasping end coupled to said prying end.

2. The tool device as recited in claim 1, further comprising a pair of arms, wherein said pair of arms intercouples said prying end and said grasping end and wherein said pair of arms is disposed to transmit a grasping force to said grasping end.

3. The tool device as recited in claim 2, wherein said prying end comprises:
   a prying protrusion; and
   a vertex coupled to said prying protrusion, said vertex intercoupling each of said pair of arms.

4. The tool device as recited in claim 2 wherein said grasping end comprises an opposing pair of pinchers intercoupled by said arms, turned in from said arms and disposed to grasp one of said plurality of optical connectors.

5. The tool device as recited in claim 4 wherein said pair of pinchers comprise a protrusion disposed to fit into a recess on said one of said plurality of optical connectors.

6. The tool device as recited in claim 2, wherein said pair of arms comprises a blocking mechanism to restrict the degree of said grasping force.

7. The tool device as recited in claim 2, wherein each of said pair of arms comprises a region of thickening to provide strength for applying said grasping force.

8. The tool device as recited in claim 2, wherein each of said each of said pair of arms further comprises a plurality of ridges for enhancing comfort and forcefulness during transmission of said grasping force.

9. The tool device as recited in claim 2, wherein said pair of arms is further disposed to transmit a prying force to said prying end.

10. The tool device as recited in claim 9, wherein said prying force is used to extract a short form factor pluggable (SFP) optical connector receptacle from a module.

11. The tool device as recited in claim 2, wherein said pair of arms is further disposed to transmit, selectively, an pushing force and a pulling force to said grasping end.

12. The tool device as recited in claim 11 wherein said pushing force is used to install said optical connector in a receptacle.

13. The tool device as recited in claim 11 wherein said pulling force is used to remove said optical connector from a receptacle.

14. The tool device as recited in claim 1 wherein each of said plurality of optical connectors comprises a type selected from the group consisting essentially of 'MTP', 'MPO', 'MT-RJ', 'MU', 'LC', 'SC', and SFP receptacles.

15. A tool device for selectively extracting, installing, and removing a plurality of optical connectors, comprising:
    means for prying; and
    means for grasping, coupled to said means for prying.

16. The tool device as recited in claim 15, wherein said means for prying and said means for grasping are disposed at opposite ends of said tool device, further comprising a pair of arms, wherein said pair of arms intercouples said means for prying and said means for grasping, and wherein said pair of arms is disposed to transmit a grasping force to said means for grasping.

17. The tool device as recited in claim 16, wherein said pair of arms comprises a means for blocking to restrict the degree of said grasping force.

18. The tool device as recited in claim 16, wherein each of said pair of arms comprises a region of thickening to provide strength for applying said grasping force.

19. The tool device as recited in claim 16, wherein each of said each of said pair of arms comprises a plurality of ridges for enhancing comfort and forcefulness during transmission of said grasping force.

20. The tool device as recited in claim 16, wherein said pair of arms is further disposed to transmit a prying force to said means for prying.

21. The tool device as recited in claim 20, wherein said prying force is used to extract a short form factor pluggable (SFP) optical connector receptacle from a module.

22. The tool device as recited in claim 16, wherein said means for prying comprises:
a prying protrusion; and
a vertex coupled to said prying protrusion, said vertex intercoupling each of said pair of arms.

23. The tool device as recited in claim 16 wherein said means for grasping comprises an opposing pair of pinchers intercoupled by said arms, turned in from said arms and disposed to grasp one of said plurality of optical connectors.

24. The tool device as recited in claim 23 wherein said pair of pinchers comprise a protrusion disposed to fit into a recess on said one of said plurality of optical connectors.

25. The tool device as recited in claim 16, wherein said pair of arms is further disposed to transmit, selectively, an pushing force and a pulling force to said grasping end.

26. The tool device as recited in claim 25 wherein said pushing force is used to install said optical connector in a receptacle.

27. The tool device as recited in claim 25 wherein said pulling force is used to remove said optical connector from a receptacle.

28. The tool device as recited in claim 15 wherein each of said plurality of optical connectors comprises a type selected from the group consisting essentially of 'MTP', 'MPO', 'MT-RJ', 'MU', 'LC', 'SC', and SFP receptacles.

* * * * *